(12) United States Patent
Haberbusch

(10) Patent No.: US 12,011,989 B1
(45) Date of Patent: Jun. 18, 2024

(54) DIRECT LIQUEFACTION FOR VEHICLE REFUELING

(71) Applicant: NEOEx Systems, Inc., Amherst, OH (US)

(72) Inventor: Mark S. Haberbusch, Amherst, OH (US)

(73) Assignee: NEOEx Systems, Inc.

( * ) Notice: Subject to any disclaimer, the term of this patent is extended or adjusted under 35 U.S.C. 154(b) by 178 days.

(21) Appl. No.: 17/578,099

(22) Filed: Jan. 18, 2022

Related U.S. Application Data

(60) Provisional application No. 63/138,468, filed on Jan. 17, 2021.

(51) Int. Cl.

| | |
|---|---|
| *F17C 5/04* | (2006.01) |
| *B60K 15/03* | (2006.01) |
| *B64D 37/14* | (2006.01) |
| *B64D 39/00* | (2006.01) |
| *B64F 1/28* | (2006.01) |

(52) U.S. Cl.
CPC .......... *B60K 15/03006* (2013.01); *F17C 5/04* (2013.01); *B60K 2015/03019* (2013.01); *F17C 2221/012* (2013.01); *F17C 2223/0161* (2013.01); *F17C 2260/022* (2013.01); *F17C 2260/025* (2013.01)

(58) Field of Classification Search
CPC .... B60K 15/03006; B60K 2015/03019; F17C 5/04; F17C 2221/012; F17C 2223/0161; F17C 2260/022; F17C 2260/025; B64U 50/34; B64U 50/00; B60S 5/02; B64D 39/06; B64F 1/28; F25J 2215/10; F25J 1/001; F25J 1/00

USPC ..... 141/350, 82; 285/904; 62/50.1, 606–607
See application file for complete search history.

(56) References Cited

U.S. PATENT DOCUMENTS

| | | |
|---|---|---|
| 1,869,487 A | 8/1932 | Leon et al. |
| 3,603,480 A | 9/1971 | Irie et al. |
| 3,946,572 A | 3/1976 | Bragg |
| H297 H | 7/1987 | Schultz |
| 4,986,446 A | 1/1991 | Montgomery et al. |

(Continued)

FOREIGN PATENT DOCUMENTS

WO 2007/059781 5/2007

*Primary Examiner* — Timothy P. Kelly
*Assistant Examiner* — Stephanie A Shrieves
(74) *Attorney, Agent, or Firm* — Renner, Otto, Boisselle & Sklar, LLP

(57) ABSTRACT

A refueling system may include an inlet tube that fluidly connects to a container containing gaseous hydrogen, a cryocooler including a cold tip and a cold head, the cold tip driven to a hydrogen liquefaction temperature by the cold head, a condensation chamber fluidly connected to the inlet tube to receive the gaseous hydrogen and thermally connected to the cryocooler cold tip, a catalyst disposed in the condensation chamber and that conducts ortho-to-para hydrogen conversion. The cryocooler cold tip absorbs a resulting exothermic reaction. The refueling system may also include a funnel fluidly connected to the condensation chamber and that receives liquid hydrogen from the condensation of the gaseous hydrogen, and a coupling mechanism fluidly connected to the funnel to receive the liquid hydrogen and having a nozzle downwardly movable to fluidly connect from above to an upwards facing tank inlet of a vehicle.

19 Claims, 14 Drawing Sheets

(56) References Cited

U.S. PATENT DOCUMENTS

| | | |
|---|---|---|
| 5,269,468 A | 12/1993 | Adiutori |
| 5,301,723 A | 4/1994 | Goode |
| 5,353,849 A | 10/1994 | Sutton et al. |
| 5,404,923 A | 4/1995 | Yamamoto |
| 5,505,237 A | 4/1996 | Magne |
| 5,548,962 A | 8/1996 | Luger et al. |
| 5,589,020 A | 12/1996 | Varghese |
| 5,771,946 A | 6/1998 | Kooy et al. |
| 5,971,040 A | 10/1999 | McFarland et al. |
| 6,024,074 A | 2/2000 | Koethe |
| 6,237,647 B1 | 5/2001 | Pong et al. |
| 6,269,848 B1 | 8/2001 | Corfitsen |
| 6,382,269 B1 | 5/2002 | Tatsuno |
| 6,513,837 B2 * | 2/2003 | Fujikawa ............... F16L 29/007 285/904 |
| 6,923,008 B2 | 8/2005 | Brook et al. |
| 7,028,724 B2 | 4/2006 | Cohen et al. |
| 7,082,969 B1 | 8/2006 | Hollerback |
| 7,093,626 B2 | 8/2006 | Li et al. |
| 7,213,400 B2 * | 5/2007 | Dickerson ............... F17C 3/085 62/48.2 |
| 7,296,601 B2 | 11/2007 | Webb |
| 7,316,242 B2 | 1/2008 | Porter et al. |
| 8,056,860 B2 | 11/2011 | Small et al. |
| 8,164,302 B2 * | 4/2012 | Capizzo ............... B60L 53/305 320/109 |
| 8,291,717 B2 * | 10/2012 | Radovinsky .......... F25D 19/006 62/50.7 |
| 8,393,362 B1 | 3/2013 | Hollerback |
| 8,667,690 B2 | 3/2014 | Cajiga et al. |
| 8,939,396 B2 | 1/2015 | Geneste |
| 8,991,444 B2 | 3/2015 | Boutet et al. |
| 9,181,078 B2 | 11/2015 | Cajiga et al. |
| 10,029,803 B1 | 7/2018 | Larsen |
| 10,429,857 B2 | 10/2019 | Weaver et al. |
| 10,773,822 B2 | 9/2020 | Haberbusch et al. |
| 10,981,666 B1 * | 4/2021 | Haberbusch ........... B64D 39/06 |
| 2001/0054818 A1 | 12/2001 | Fujikawa et al. |
| 2004/0055642 A1 | 3/2004 | Valentian |
| 2006/0026969 A1 * | 2/2006 | Brook ..................... F16L 59/18 62/50.7 |
| 2010/0019090 A1 | 1/2010 | Mouskis et al. |
| 2015/0123462 A1 | 5/2015 | Kamradt |
| 2017/0050749 A1 | 2/2017 | Pilskalns |
| 2017/0341769 A1 * | 11/2017 | Haberbusch ............ B64F 1/28 |
| 2018/0196418 A1 * | 7/2018 | Meier ................... B64C 39/024 |
| 2018/0229852 A1 | 8/2018 | Boss et al. |
| 2018/0312390 A1 | 11/2018 | Homann et al. |
| 2019/0077521 A1 | 3/2019 | Kelly et al. |
| 2020/0180940 A1 | 6/2020 | Rainville |
| 2020/0318895 A1 * | 10/2020 | Kiener .................. F25J 1/0257 |

\* cited by examiner

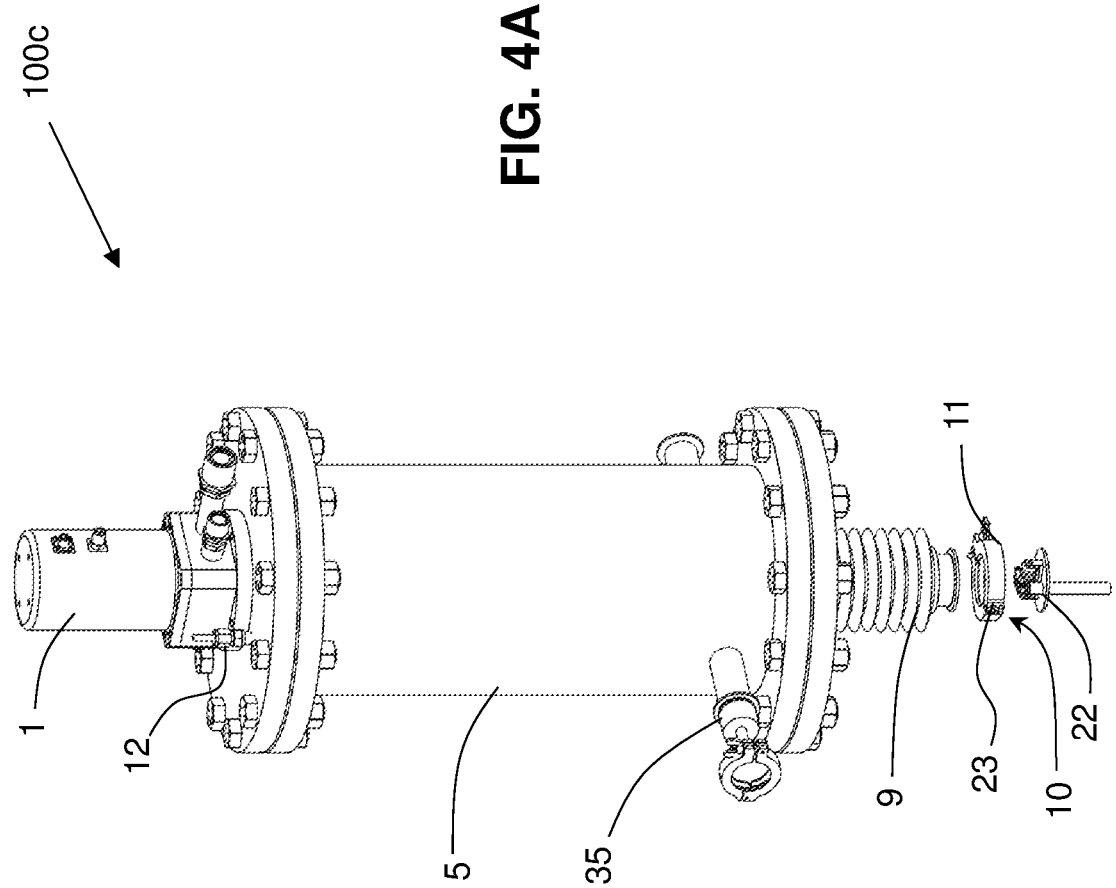

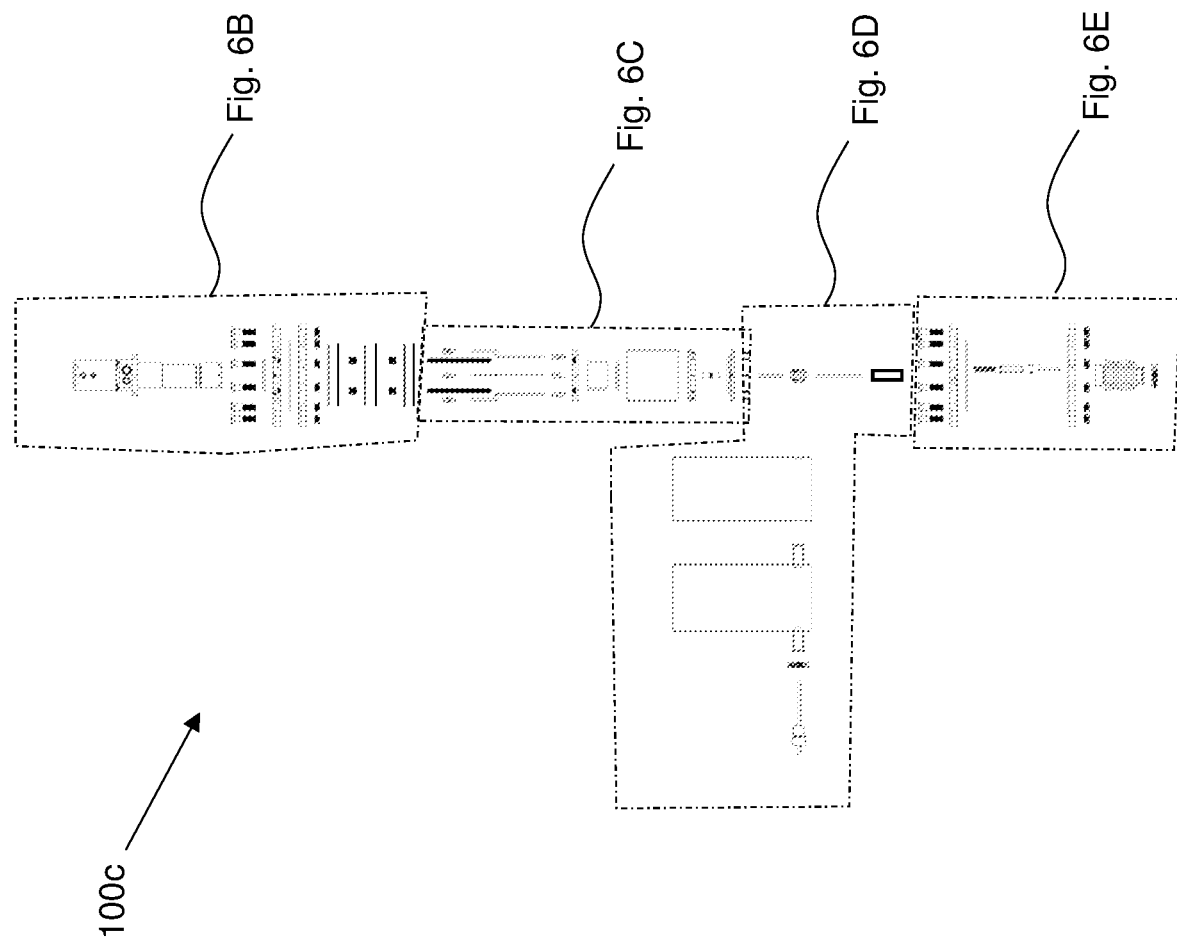

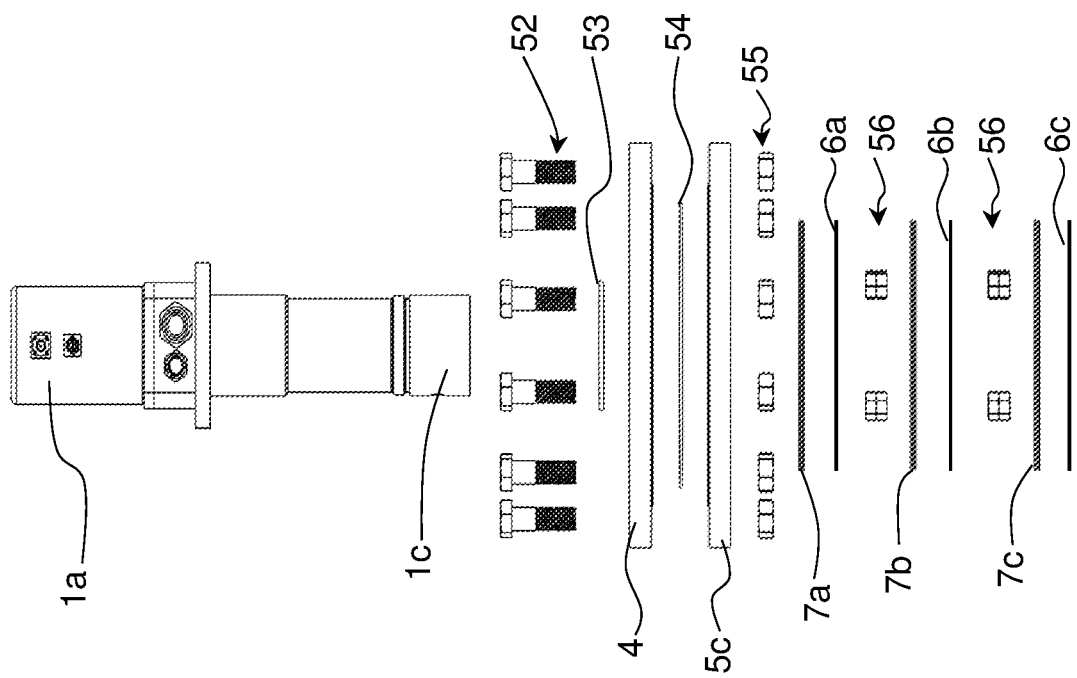

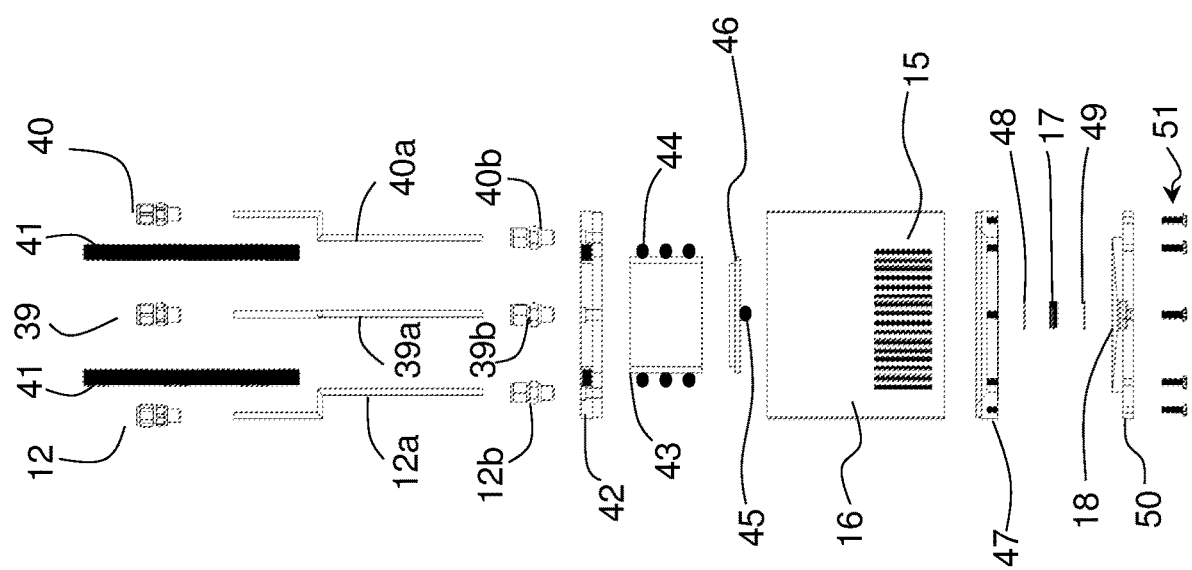

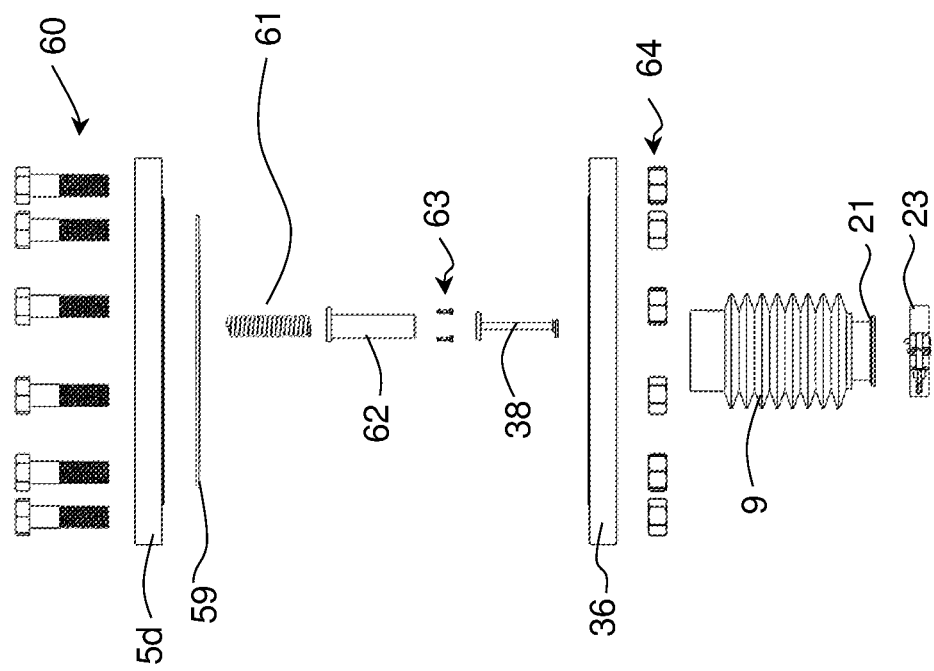

DIRECT LIQUEFACTION FOR VEHICLE REFUELING

BACKGROUND

Liquid hydrogen is typically provided by compressed gas suppliers and their distributors to their customers. Large liquid hydrogen storage Dewars are either permanently installed on the customer site or transported to the customer site and temporarily left on the customer site for use until empty. These storage Dewars then require and extensive set of ground support equipment to transfer the hydrogen between the storage Dewar and where the customer is using the liquid hydrogen for product development or validation. The ground support equipment usually includes long lengths of vacuum jacketed piping and valves. This equipment along with the storage Dewar that are expensive to purchase or rent, custom made, and require a large footprint of land to sit on. This land must be modified to meet certain compressed gas supplier requirements based on best practices and standards. Modifications may include such things as a cement pad and secure fencing. In addition, substantial amount of land is needed for the liquid hydrogen delivery trailers to maneuver. All of these hardware requirements and land usage are cost prohibited to those that only require a small amount of liquid hydrogen (less than 100 L). In addition, remote locations logistically do not have access to liquid hydrogen at all.

As a result, obtaining small quantities of liquid hydrogen to conduct experiments and validate prototypes of products that store and use liquid hydrogen and conduct flight operations in remote locations has been determined to be cost prohibitive with many logistical and legal barriers. There is a demand for a system for making small quantities of liquid hydrogen at relatively low cost with relatively small amount of hardware required.

SUMMARY OF THE INVENTION

To this end, an invention is disclosed that addresses these issues by taking room temperature gaseous hydrogen in high pressure bottles that are commercially available at reasonable prices or gaseous hydrogen generated locally and liquefying the hydrogen using a cryocooler directly on top of a closely coupled UAV flight Dewar.

The systems disclosed herein will enable extremely long-duration (20 hours)/long-range (1,000 miles) operations for Unmanned Aerial Vehicles (UAVs). This UAV liquid hydrogen energy storage technology combined with fuel cell produced electrical power is scalable for commercial UAVs operating at less than 55 lbs. all the way up to Personal Air Vehicles or flying cars. The technology disclosed herein may work in combination with systems and processes for refueling the UAV flight Dewar patented by NEOEx as U.S. Pat. Nos. 10,773,822 and 10,981,666, the disclosures of which are hereby incorporated by reference in their entirety.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF THE DRAWINGS

FIG. 4A illustrates a perspective view of an exemplary alternative version of the direct liquid hydrogen apparatus with the addition of a rotary feed through for a mechanical isolation valve.

FIG. 6A illustrates a perspective view exploded view of the direct liquid hydrogen apparatus in various sections.

FIG. 6B illustrates an exploded view of the top section of the direct liquid hydrogen apparatus.

FIG. 6C illustrates an exploded view of the top middle section of the direct liquid hydrogen apparatus.

FIG. 6E illustrates an exploded view of the bottom section of the direct liquid hydrogen apparatus.

DETAILED DESCRIPTION

Figure 1:
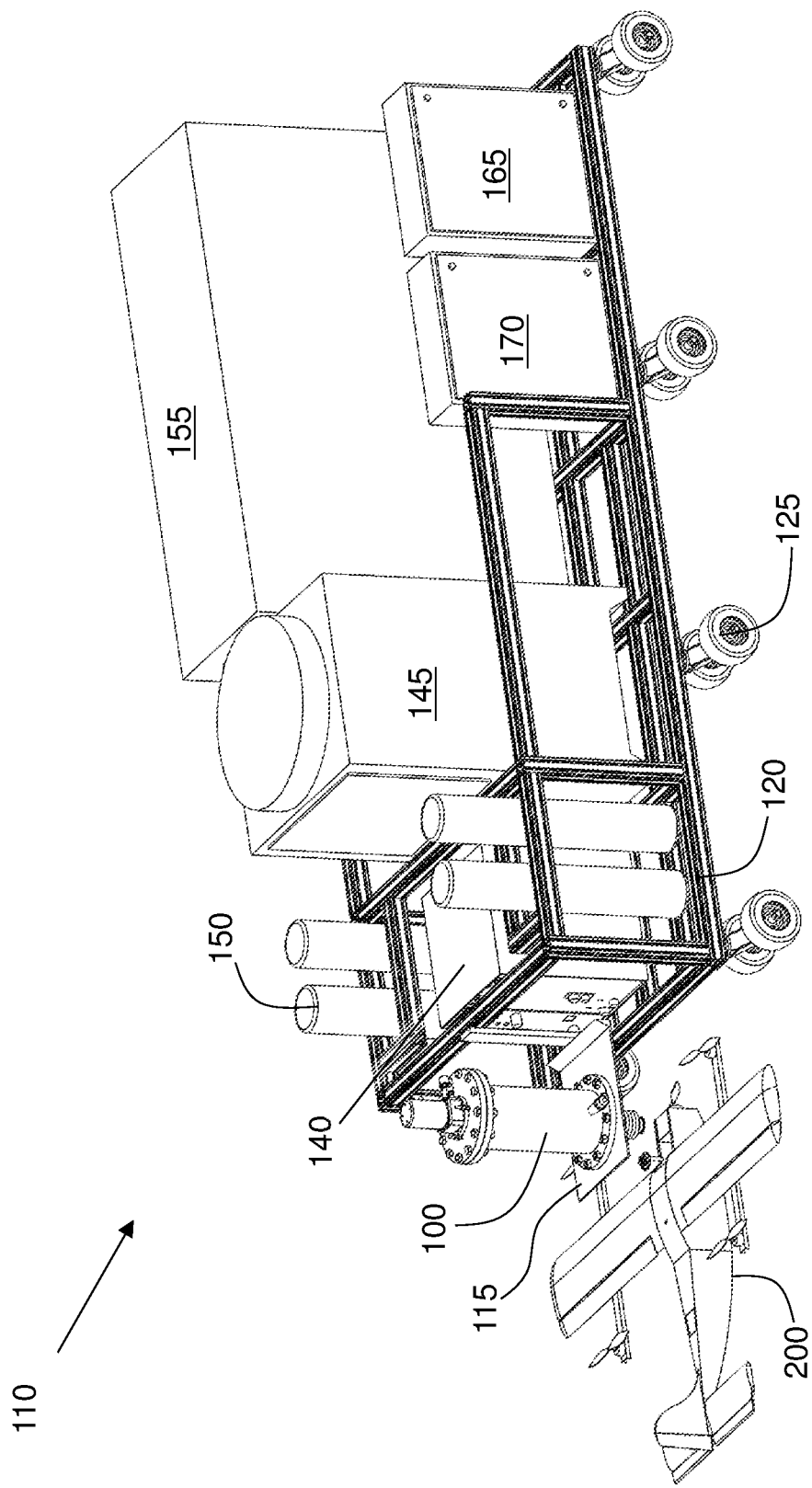
FIG. 1 illustrates a perspective view of an exemplary system for refueling a vehicle.

FIG. 1 illustrates an exemplary system 110 for refueling a vehicle 200. The system 110 may include a frame or skid 120 which may include wheels or casters 125 for facilitating transport of the system 110. The system 110 may include an apparatus 100 for direct liquefaction of hydrogen, as described in detail below. The apparatus 100 may be installed on a hydraulic lift 115 for lifting and lowering the apparatus 100. The system 110 may also include a compressor 140, a chiller 145, gas storage 150, a generator 155, an energy storage (batteries) cabinet 165, and an instrumentation and controls cabinet 170. The system 110 is described herein for contextual purposes and is not meant to limit the herein disclosed apparatus 100 for direct liquefaction of hydrogen.

Figure 2A:
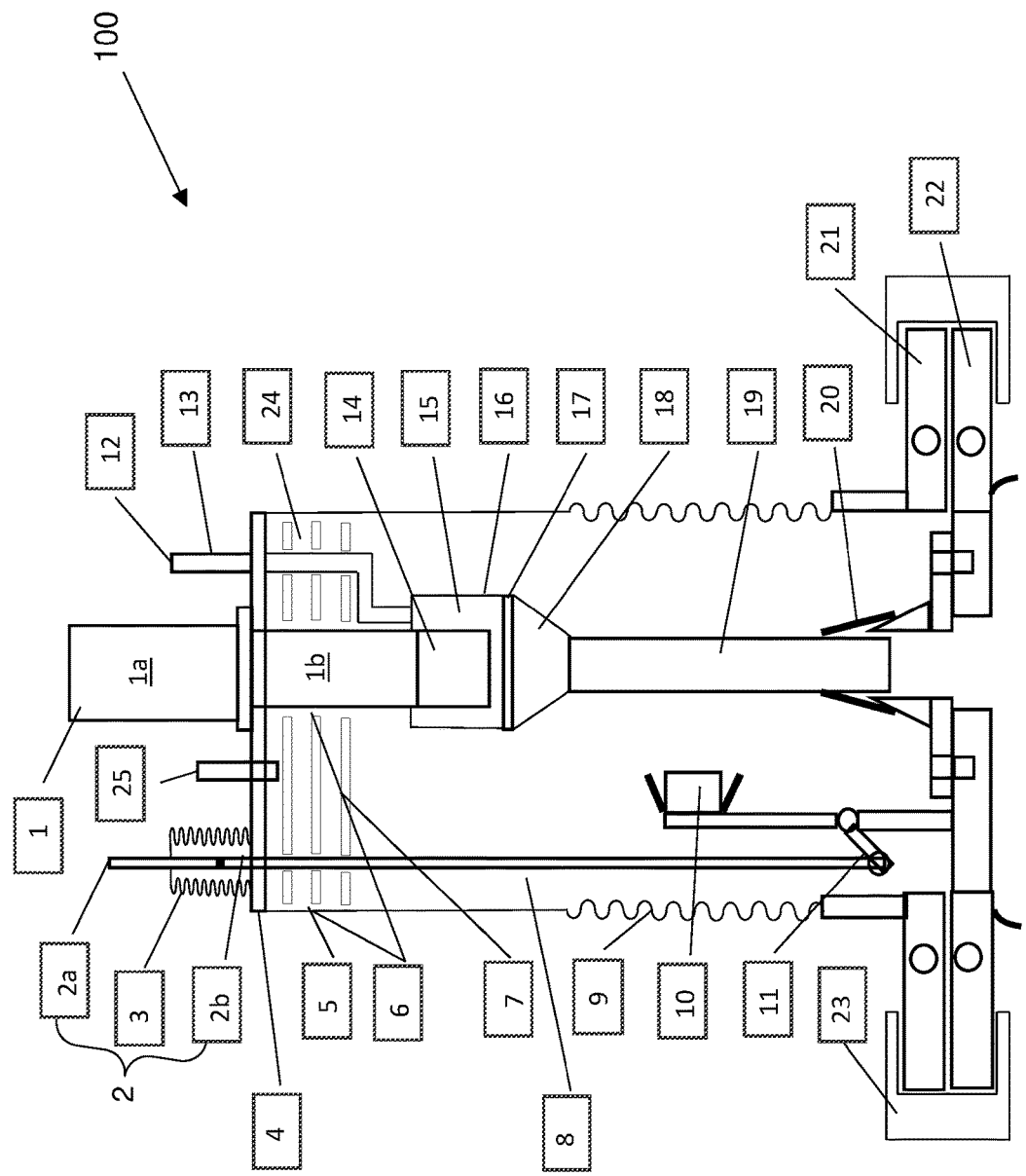
FIG. 2A illustrates a schematic drawing of an exemplary apparatus for direct liquefaction of hydrogen into a flight Dewar.

FIG. 2A illustrates a schematic drawing of an exemplary apparatus 100 for direct liquefaction of hydrogen into a flight Dewar. The apparatus 100 may be used for producing liquid hydrogen without the need for vacuum jacketed transfer hoses. The apparatus 100 is compact and may be designed to interface with the systems and methods for the transfer of cryogenic fluids disclosed in U.S. Pat. Nos. 10,773,822 and 10,981,666. The apparatus 100 may include a cryocooler 1 that includes cold head 1a, a middle portion 1b, and a cold tip 1c, an actuator rod 2 (including a top portion 2a and a bottom portion 2b), bellows 3 for the actuator rod 2, a cryocooler mounting flange 4, a liquefier chamber 5 that in itself may be constructed of a vacuum jacketed insulated wall, radiation shield wall seals 6, radiation shields 7, insulation (aerogel with multilayer insulation) 8, main bellows 9, a cap 10 with compression fitting features, a cap arm hinge mechanism 11, a cold hydrogen gas inlet 12, cryogenic foam insulation (polyurethane) 13, an ortho-to-para conversion catalyst 15, a condensation chamber 16, a mesh screen filter 17, a drain funnel 18, a liquid transfer tube nozzle 19 (shown in FIG. 1 in refueling configuration), a transfer tube nozzle compression fitting 20, a coupling flange 21, a tank flange 22, a flange clamp 23, a vacuum space 24, and a vacuum port 25.

The direct hydrogen liquefaction apparatus coupling flange 21 may be connected to the tank flange 22 and held together by the flange clamp 23. A vacuum may be created in the vacuum space 24 through the vacuum port 25 to eliminate any air and moisture in the system and to improve the performance of the insulation 8. The cap 10 that is normally closed on the UAV liquid hydrogen flight tank may then be pressed open using the actuator rod 2 via the cap arm hinge mechanism 11. The actuator arm 2 may be made of two materials to minimize heat leak towards the flight tank. For example, the actuator arm's upper portion 2a may be made of stainless steel or similar material and the lower portion 2b may be made of a composite material such as G10 high-pressure fiberglass laminate composite or similar material for low thermal conductivity and high strength at cryogenic temperatures. A stainless-steel flexure bellows 3 may be attached to the rod 2.

Radiation shields 7 may be located at the top of the liquefier chamber 5 to keep the cryocooler mounting flange 4 from getting cold. Radiation shield wall seals 6 of a compliant seal material (e.g., Kapton) may be located against the walls of the liquefier chamber 5 and the cryocooler 1b to keep convective flows from forming and increasing heat transfer. A bellows 9 may be used to provide flexibility in independently moving and connecting the liquid transfer tube nozzle 19 and the actuator rod 2.

Cold gaseous hydrogen that is pre-chilled using a liquid nitrogen bath or another cryocooler may be introduced into the liquefier chamber 5 through the cold gaseous hydrogen inlet tube 12 that may be insulated with cryogenic temperature rated foam 13 (e.g., two-part polyurethane foam). The gaseous hydrogen coming in should be at a steady state condition of ortho to para hydrogen concentration at a temperature of 80 K or lower. This can be achieved by running the gaseous hydrogen through an ortho to para conversion catalyst at 80 K.

The cold gaseous hydrogen may then enter the condensation chamber 16 around and cooled by the cryocooler cold tip 1c. The cryocooler cold tip 1c may be driven to the hydrogen liquefaction temperature of between 20 and 25 K by the cryocooler cold head connected to a compressor (not shown). Further ortho-to-para hydrogen conversion may be conducted using the catalyst 15 and the cryocooler cold tip 1c absorbs the exothermic reaction. Liquid may then drip into the funnel 18 by gravitational force and into the liquid transfer tube nozzle 19. The liquid transfer nozzle compression fitting 20 seals onto the tank flange 22. Any vapor that is generated as the system is cooled down will rise back into the condensation chamber 16 and re-condense. The cold hydrogen inlet 12 is maintained at a constant pressure of approximately 50 psia or below.

System 100 achieves liquefaction from above the flight tank, eliminating the need for vacuum jacketed transfer hoses. Room temperature gaseous hydrogen may be procured in high pressure bottles (commercially available at reasonable prices) and the gaseous hydrogen therein turned into liquid hydrogen locally at the refueling site (and indeed right above the aircraft fuel tank inlet) using a cryocooler above a closely coupled UAV flight Dewar. This approach lowers cost and amount of hardware.

Figure 2B:
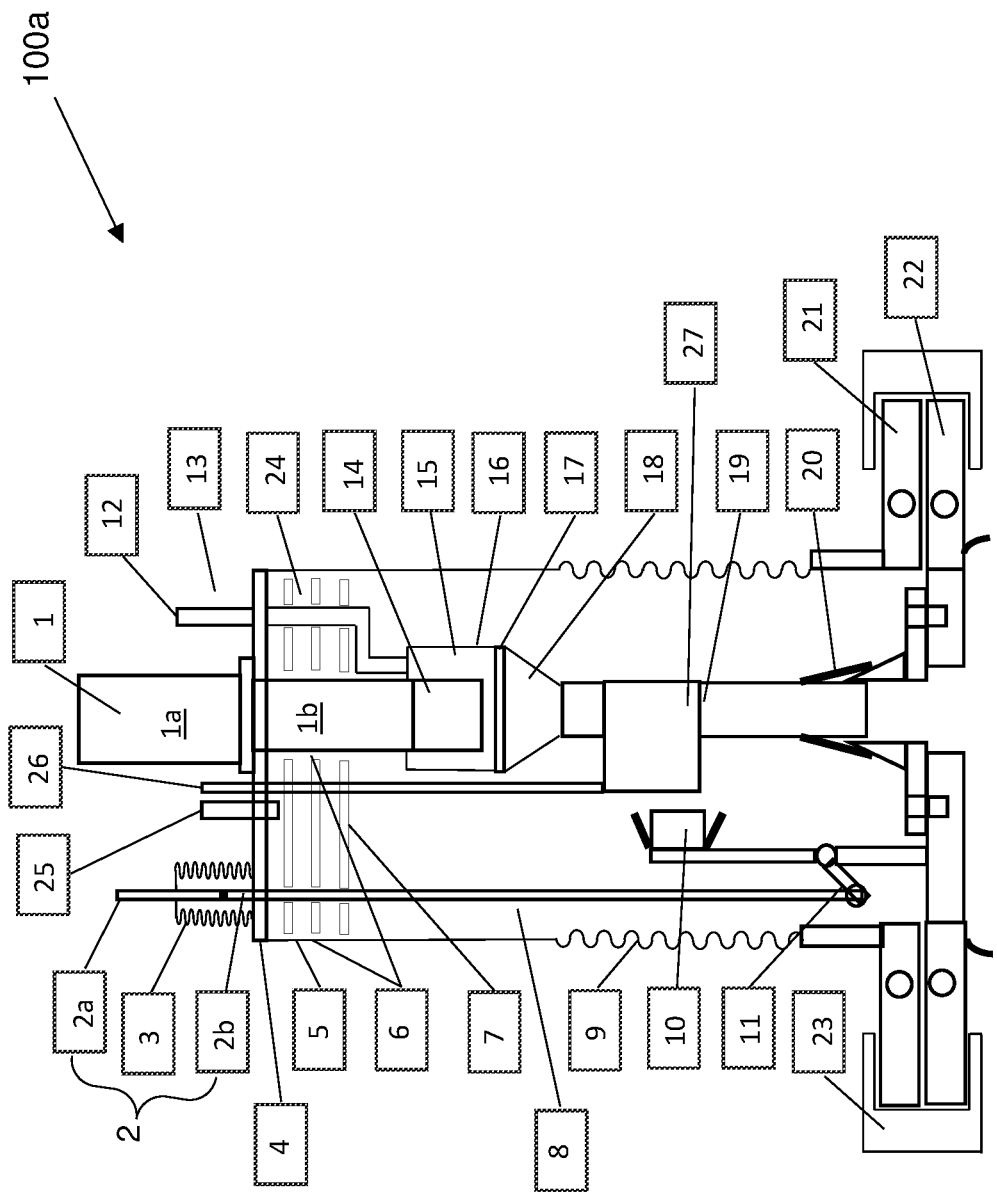
FIG. 2B illustrate a schematic diagram of an exemplary alternative version of the direct liquid hydrogen apparatus with the addition of an isolation valve.

FIG. 2B illustrate a schematic diagram of an exemplary alternative version of the direct liquid hydrogen apparatus 100a with the addition of an isolation valve 27 that fluidly traverses the liquid transfer nozzle 19. The valve 27 may be pneumatically actuated using gaseous helium because the gas does not condense at 20 K.

Figure 2C:
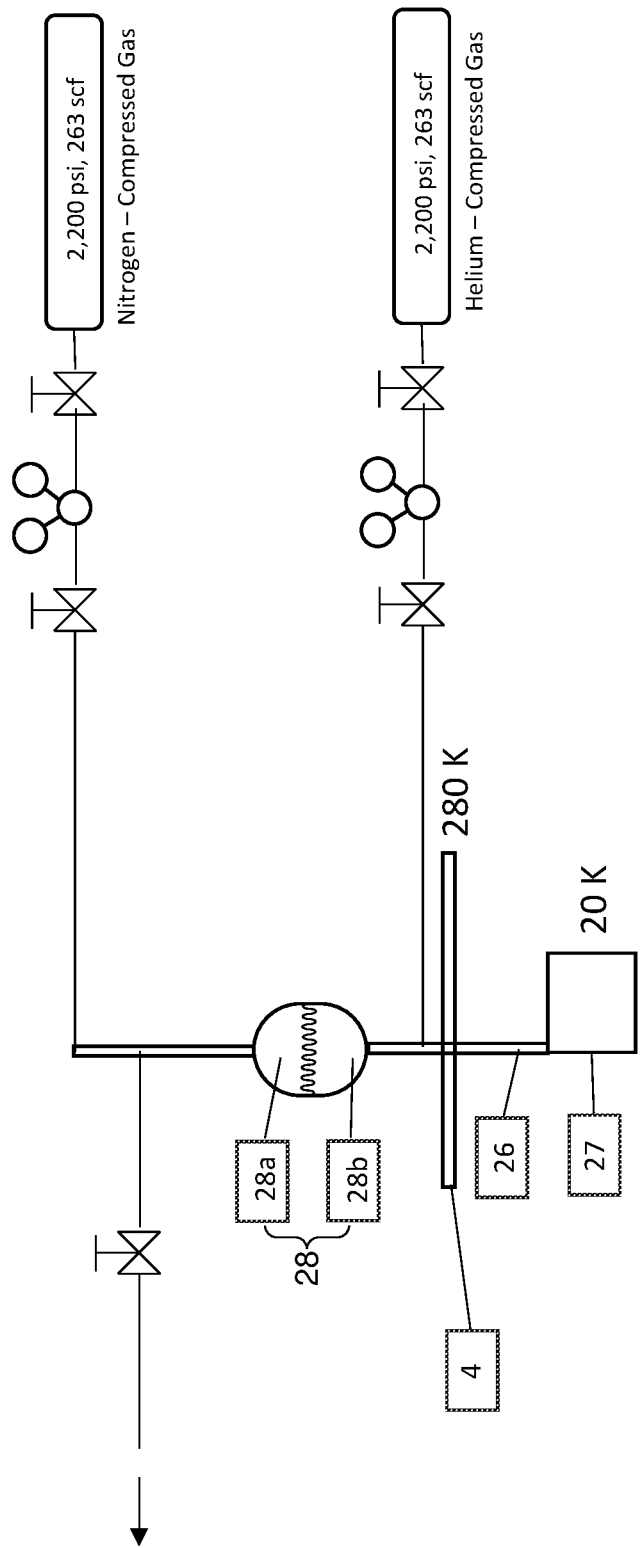
FIG. 2C illustrates a schematic diagram of an exemplary actuator system that works with the system.

FIG. 2C illustrates a schematic diagram of an exemplary actuator system 200 that works with the system 100a. Helium is a non-renewable resource. This invention will minimize the use of helium in cryogenic hydrogen system 100a by eliminating the loss of helium in the actuator when the valve 27 is opened and closed.

The helium saver actuator system 200 may include a pneumatic bladder 28 that is operably connected to the valve 27 and is divided in two halves 28a, 28b. The first half 28a has gaseous nitrogen in it and the second half 28b has gaseous helium in it. The bladder 28 operates at room temperature. The pneumatic valve 27 is normally closed and actuated by a spring. Helium pressure is required to counter the spring force to open the valve 27. The helium half 28b of the bladder is charged up to operating pressure via one or more tubes 26 just prior to opening the valve 27. Nitrogen pressure is supplied via the one or more tubes 26 to the other half 28a of the bladder which pressurizes the helium side and opens the valve 27. Nitrogen pressure may then be relieved via the one or more tubes 26 and vented to the atmosphere to close the valve 27.

An alternative would be to replace the pneumatically actuated valve 27 with an electric solenoid valve that can operate at 20 K. This would eliminate all use of helium. The helium tube 26 would be replaced with electrical power leads to the solenoid actuator.

Figure 3:
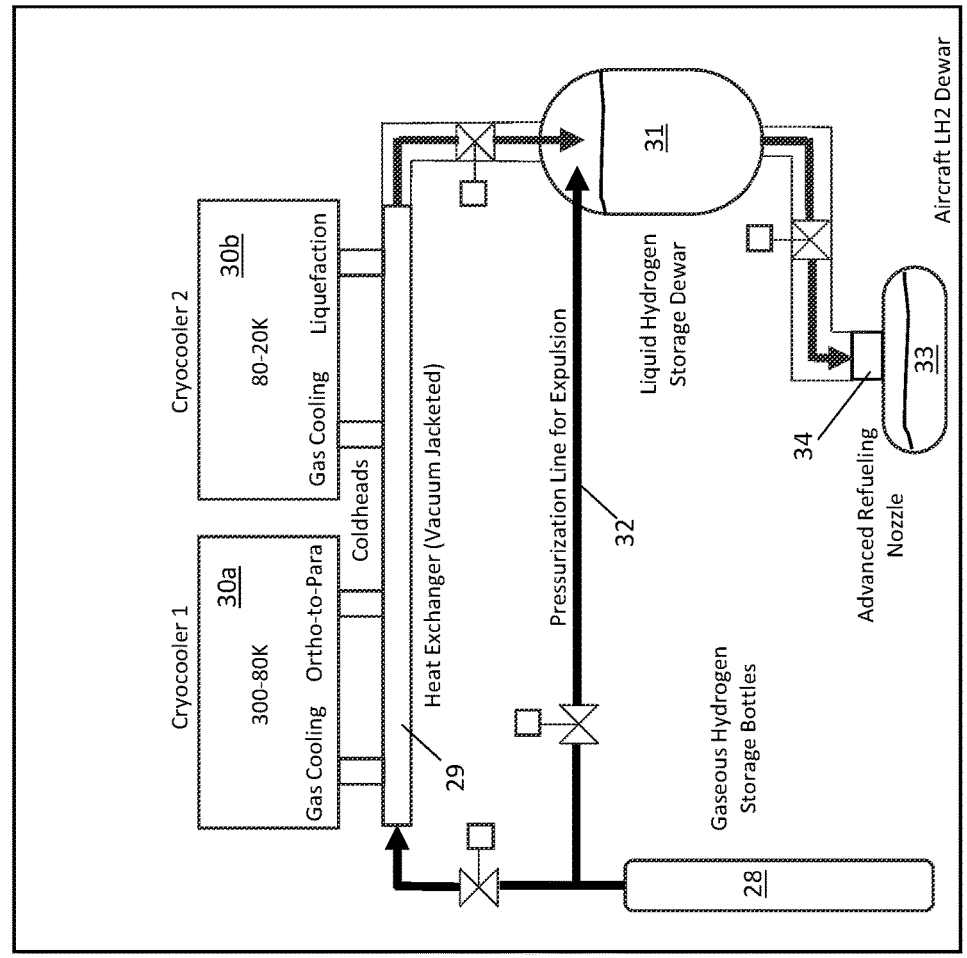
FIG. 3 illustrates a schematic diagram of yet another exemplary alternative version of the direct liquid hydrogen apparatus.

FIG. 3 illustrates a schematic diagram of yet another exemplary alternative version of the direct liquid hydrogen apparatus 100b. The system 100b involves flowing high pressure gaseous hydrogen 28 through a series of heat exchangers 29 thermally attached to various cryocoolers 30a, 30b. Each cryocooler 30a, 30b is specifically sized to reduce the gas temperature, remove heat of the ortho-to-para hydrogen conversion process, and then liquefy the gas. In this scenario the liquid is stored in a Dewar 31 at low pressure and then, once filled, is transferred via pressure 32 into the UAV 33 using the apparatus 34 patented in U.S. Pat. Nos. 10,773,822 and 10,981,666.

Figure 4B:
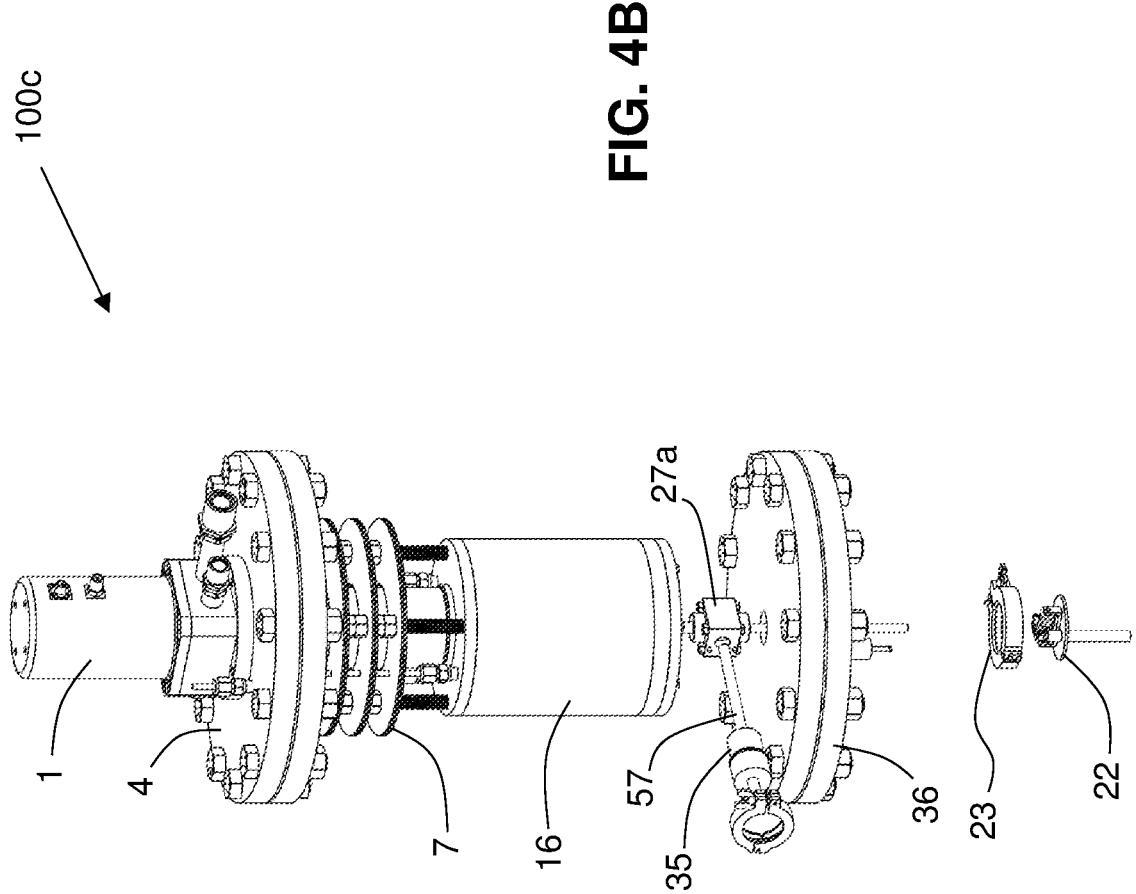
FIG. 4B illustrates a transparent perspective view of the exemplary alternative version of the direct liquid hydrogen apparatus with the addition of a mechanically driven isolation valve.
Figure 4C:
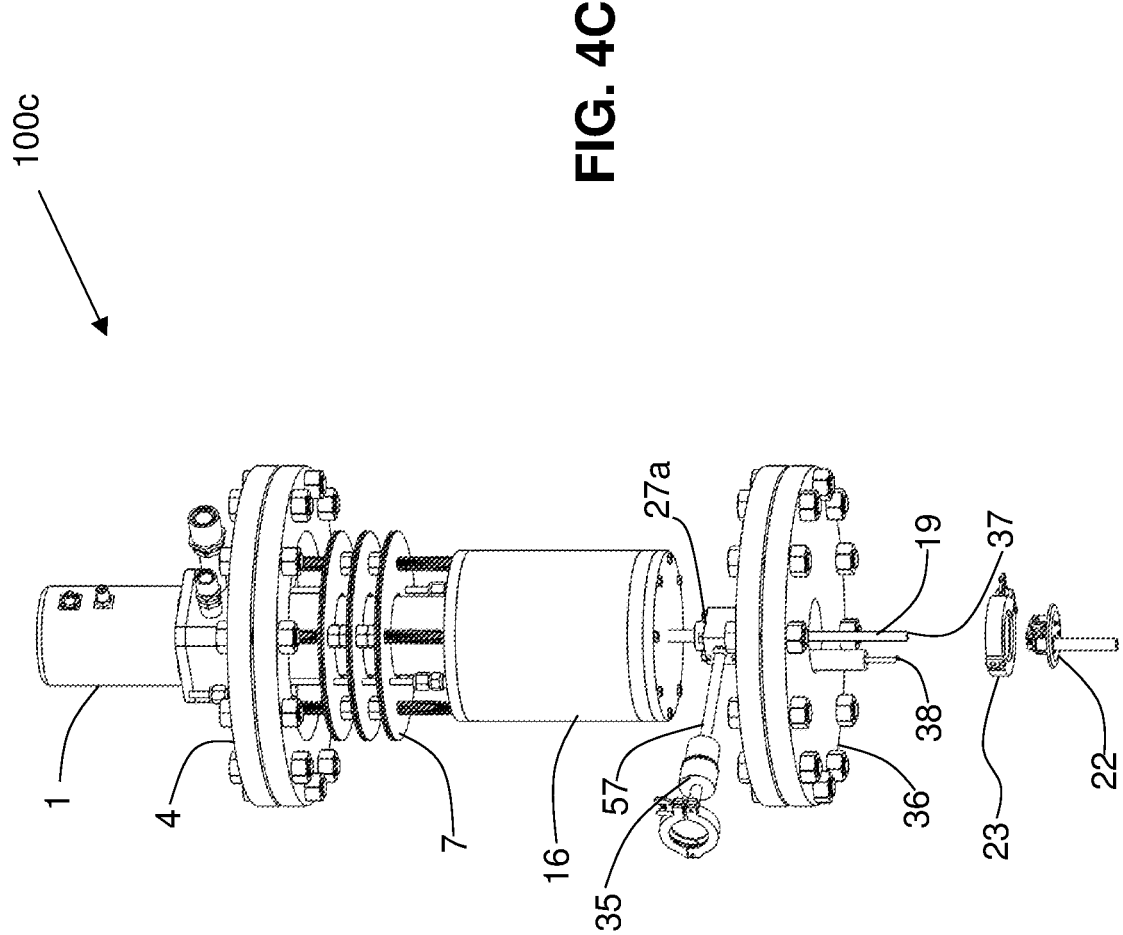
FIG. 4C illustrates a transparent perspective view of the exemplary alternative version of the direct liquid hydrogen apparatus with the addition of a fill level sensor incorporated into the fill tube nozzle.

FIG. 4A illustrates a perspective view of an exemplary alternative version of the direct liquid hydrogen apparatus 100c with the addition of a rotary feed through 35 for a mechanically actuated liquid hydrogen isolation valve 27a (shown in FIGS. 4B and 4C). The rotary feed through 35 enables the use of a manual or automated actuator to open and close the liquid hydrogen isolation valve 27a.

FIG. 4B illustrates a transparent perspective view of the exemplary alternative version of the direct liquid hydrogen apparatus 100c with the addition of a mechanically driven isolation valve 27a connected to a rotary feed through 35 via a rotary actuator rod 57.

FIG. 4C illustrates a transparent perspective view of the exemplary alternative version of the direct liquid hydrogen apparatus 100c with the addition of a fill level sensor 37 incorporated into the liquid transfer tube nozzle 19. The sensor 37 enables accurate filling of the flight tank using ground support equipment thus reducing the amount of sensing hardware on the flight vehicle. The fill level sensor 37 senses a fill level of the vehicle's tank and communicates the information. Fueling may be terminated upon the sensor 37 detecting a certain fuel level in the tank. FIG. 4C also shows the cap opener plunger 38.

Figure 5A:
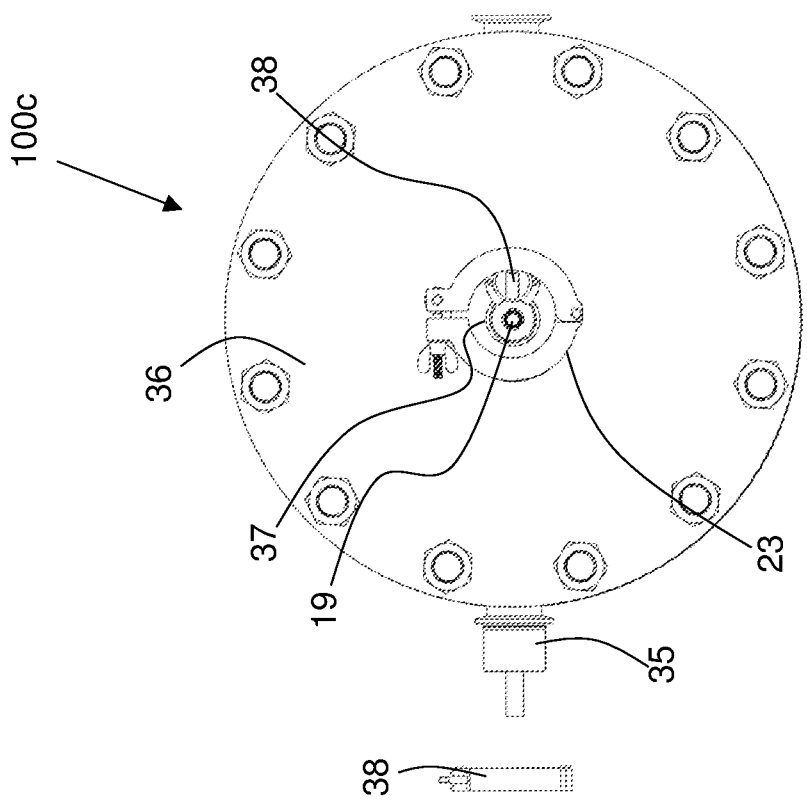
FIG. 5A illustrates a top view of an exemplary alternative version of the direct liquid hydrogen apparatus with the addition of feed throughs for a cryocooler temperature sensor and heater.

FIG. 5A illustrates a top view of the exemplary alternative version of the direct liquid hydrogen apparatus 100c with the addition of feed throughs 40 and 39 for a cryocooler temperature sensor 45 and heater 44, respectively, for controlling the cryocooler cold tip 1c temperature during the hydrogen liquefaction process.

Figure 5B:
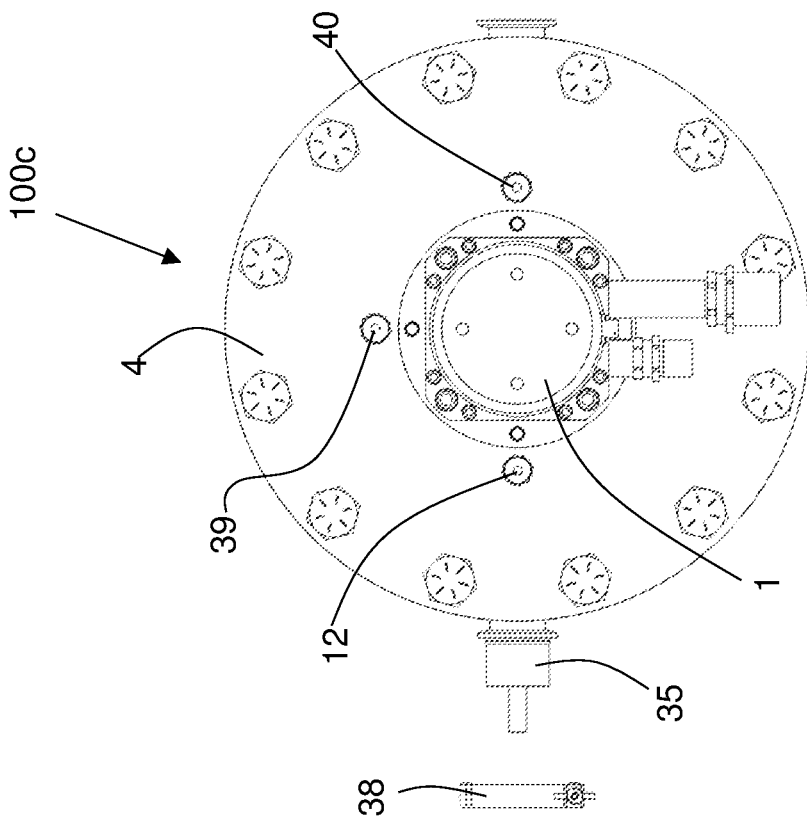
FIG. 5B illustrates a bottom view of an exemplary bottom view of the direct liquid hydrogen apparatus.

FIG. 5B illustrates a bottom view of a perspective view of the exemplary alternative version of the direct liquid hydrogen apparatus 100c with the addition of the fill level sensor 37 integrated into the liquid transfer tube nozzle 19 and the bellows mounting flange 36 that connects the bellows 9 to the bottom of the liquefier chamber 5 via the liquefier chamber bottom flange 5d as shown in FIG. 6E.

Figure 6D:
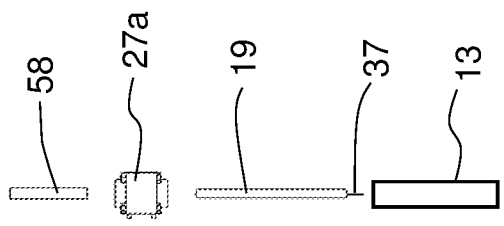
FIG. 6D illustrates an exploded view of the bottom middle section of the direct liquid hydrogen apparatus.
Figure 6D:
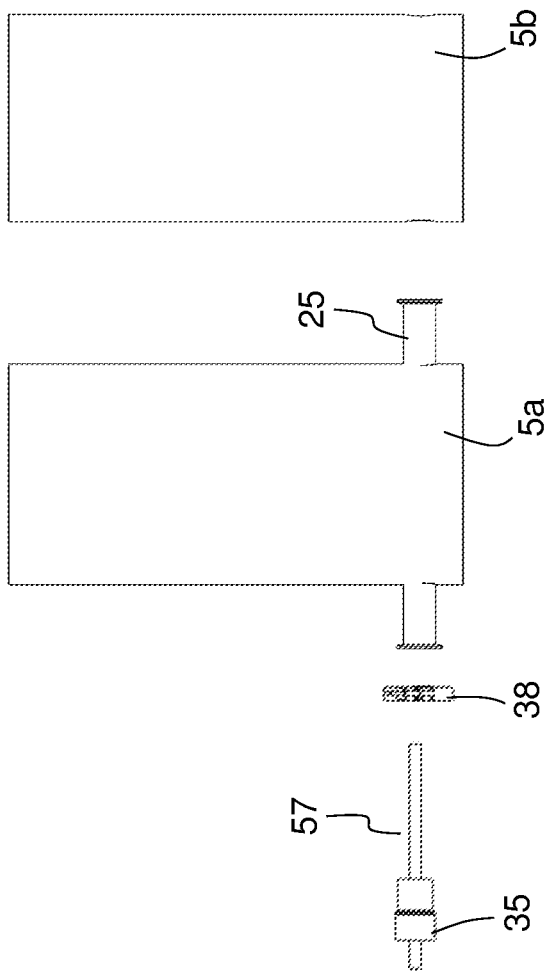

FIG. 6A illustrates an exploded view of the exemplary direct liquid hydrogen apparatus 100c in four sections that would be described in more detail in FIGS. 6B-6E. Insulation of the various cryogenic parts in each section is not shown.

FIG. 6B illustrates an exploded view of the top section of the direct liquid hydrogen apparatus. The cryocooler cold head 1a is installed into the cryocooler mounting flange 4 and is sealed to 4 using cryocooler flange seal 53. The cryocooler mounting flange is attached to the liquefier chamber top flange 5c using bolts 52 and nuts 55 and is sealed using cryocooler mounting flange seal 54. Radiation shields 7a, 7b, and 7c are mounted to the bottom of flange 4 using threaded rods 41 shown in FIG. 6C. Space nuts 56 are used to separate and hold the radiation shields in place. Radiation shield wall seals 6a, 6b, and 6c are used to minimize convection along the liquefier chamber 5 wall.

FIG. 6C illustrates an exploded view of the top middle section of the direct liquid hydrogen apparatus 100c. Split seal fittings are used as feed throughs for cold gaseous hydrogen 12, cold tip heater power wires 39, and cold tip temperature measurement wires 40. Tubes 12a, 39a, and 40a are used to connect 12, 39, and 40 to the condensation chamber 16 split seal fitting feed throughs 12b, 39b, and 40b. The condensation chamber 16 consists of a top flange 42 constructed of stainless steel, an inner wall 43 constructed of oxygen-free high thermal conductivity (OFHC) copper, an inner wall flange 46 constructed of OFHC copper, the condensation chamber outer wall 16 is constructed of stainless steel, the filter flange 47 constructed of stainless steel, and the condensation bottom flange 50 constructed of stainless steel. The condensation bottom flange 50 features a drain funnel 18, mesh screen filter 17, top flange 48 for holding filter 17, and a bottom flange 49 for holding filter 17. Bolts 51 hold the condensation chamber bottom flange 50 to the filter flange 47 and are sealed using a copper gasket and serrated sealing surfaces (not shown). Ortho-to-para hydrogen catalyst 15 is installed inside the condensation chamber. A heater 44 is mounted to the external wall of the condensation chamber inner wall 43 to control the temperature of the inner wall based on temperature measurements from temperature sensor 45.

FIG. 6D illustrates an exploded view of the bottom middle section of the direct liquid hydrogen apparatus. The liquid hydrogen isolation valve 27a, which can be a cryogenic ball valve, is mechanically actuated using a rotary actuator rod 57 and a rotary feed through 35. A manual or automated actuator (not shown) on the outside of the liquefier chamber 5 can be used to open and close valve 27a. The rotary feed through is mounted to the liquefier chamber outer vacuum wall 5a via a vacuum clamp 38. A vacuum port 25 is used to pull vacuum inside the liquefier chamber. A separate vacuum pump out not shown is used to pull vacuum between the liquefier chamber outer vacuum wall 5a and the inner vacuum wall 5b. Liquid hydrogen generated in the condensation chamber 16 drains via gravity through the liquid transfer tube 58, liquid hydrogen isolation valve 27a, and the liquid transfer nozzle 19 into the flight tank not shown. The fill level sensor 37 is used to accurately measure the full level of the tank. The fill tube insulation 13 insulates the liquid transfer nozzle 19.

FIG. 6E illustrates an exploded view of the bottom section of the direct liquid hydrogen apparatus. The figure shows the bellows mounting flange 36 is attached to the liquefier chamber bottom flange 5d using bolts 60 and nuts 64. The flanges 5d and 36 are sealed using seal 59. Bellows 9 is attached to the bellows mounting flange 36 on one end and to a coupling flange 21 at the other end. The coupling flange 21 is attached to the tank flange 22 using flange clamp 23. The tank cap is opened using the cap opener plunger 38 and a compression spring 61 housed inside the spring housing 62. The spring housing 62 is mounted to the liquefier chamber bottom flange 5d using bolts 63.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

As used herein, an "operable connection" or "operable coupling," or a connection by which entities are "operably connected" or "operably coupled" is one in which the entities are connected in such a way that the entities may perform as intended. An operable connection may be a direct connection or an indirect connection in which an intermediate entity or entities cooperate or otherwise are part of the connection or are in between the operably connected entities. In the context of signals, an "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A refueling system for vehicles, comprising:
   an inlet tube configured to fluidly connect to a container containing gaseous hydrogen;
   a cryocooler including a cold tip and a cold head, the cold tip configured to be driven to a hydrogen liquefaction temperature of between 20 and 25 K by the cold head;
   a condensation chamber fluidly connected to the inlet tube to receive the gaseous hydrogen and thermally connected to the cryocooler cold tip;
   a catalyst disposed in the condensation chamber and configured to conduct ortho-to-para hydrogen conversion, wherein the cryocooler cold tip absorbs a resulting exothermic reaction;
   a funnel fluidly connected to the condensation chamber and configured to receive liquid hydrogen from the condensation of the gaseous hydrogen; and
   a coupling mechanism fluidly connected to the funnel to receive the liquid hydrogen and having a nozzle downwardly movable to fluidly connect from above to an upwards facing tank inlet of a vehicle.

2. The refueling system of claim 1, comprising:
   a liquefier chamber within which the condensation chamber resides, the liquefier chamber having an inlet through which the inlet tube passes and an outlet through which the nozzle passes;
   a vacuum port fluidly connected to the liquefier chamber and configured to connect to a vacuum exerting mechanism to extract gases from in a vacuum space of the liquefier chamber.

3. The refueling system of claim 2, comprising:
   a cryocooler mounting flange disposed at a top portion of the liquefier chamber;
   radiations shields disposed between the cryocooler mounting flange and the condensation chamber to thermally insulate the cryocooler mounting flange from the condensation chamber;
   wall seals disposed a) between first abutting edges of the radiation shields and a wall of the liquefier chamber and b) between second abutting edges of the radiation shield and a portion of the cryocooler located inside the liquefier chamber.

4. The refueling system of claim 1, comprising:
   a bellows disposed with respect to the nozzle and fuel tank inlet with respect to which the bellows is configured to move vertically for supplying liquid hydrogen to the fuel tank inlet to provide a confined volume at which a connection is made between the nozzle and the fuel tank inlet.

5. The refueling system of claim 1, comprising:
   an actuator arm configured to connect to a fuel tank cap and including a mechanism configured to, upon the nozzle being fluidly connected from above to the upwards facing tank inlet of the vehicle, actuate to remove the fuel tank cap from the fuel tank inlet, the actuator arm made of two materials to minimize heat leak towards the fuel tank, an upper portion of the actuator rod made of stainless steel and a lower portion of the actuator made of a composite material.

6. The refueling system of claim 5, comprising:
   a stainless-steel flexure bellows attached to the actuator arm.

7. The refueling system of claim 1, comprising:
   an isolation valve fluidly connected to the nozzle, the isolation valve pneumatically actuated using gaseous helium.

8. The refueling system of claim 7, comprising:
   a pneumatic bladder operably connected to the isolation valve and divided in two halves, a first half receives gaseous nitrogen and a second half receives gaseous helium;
   a spring operably connected to the isolation valve to actuate the isolation valve to a closed position;
   wherein when the first half and the second half of the bladder are charged up to operating pressure, the bladder actuates the valve to the open position,
   wherein release of gaseous nitrogen from the first half discharges the bladder, releasing the isolation valve to the closed position.

9. The refueling system of claim 1, comprising:
   an isolation valve fluidly connected to the nozzle, the isolation valve electrically actuated.

10. The refueling system of claim 1, comprising:
    an isolation valve fluidly connected to the nozzle, the isolation valve mechanically actuated.

11. The refueling system of claim 1, comprising:
    a temperature sensor and a heater, each thermally coupled to the condensation chamber, the heater configured to selectively increase temperature based on temperature readings of the temperature sensor for increasing temperature of the cold tip during hydrogen liquefaction.

12. The refueling system of claim 1, comprising:
    a fill level sensor incorporated into the nozzle and configured to sense a fill level of the tank of the vehicle, the fill level sensor configured to one of:
    inform of a fuel level of the tank of the vehicle, or
    cause termination of fueling upon detecting a certain fuel level in the tank.

13. A refueling system for vehicles, comprising:
    an inlet tube configured to fluidly connect to a container containing gaseous hydrogen;
    a cryocooler including a cold tip, a cold head, a temperature sensor, and a heater, the cold tip configured to be lowered below a hydrogen liquefaction temperature by the cold head, the cold tip configured to be raised in temperature by the heater based on a measurement by the temperature sensor;

a condensation chamber fluidly connected to the inlet tube to receive the gaseous hydrogen and thermally connected to the cryocooler cold tip;

a catalyst disposed in the condensation chamber and configured to conduct ortho-to-para hydrogen conversion, wherein the cryocooler cold tip absorbs a resulting exothermic reaction;

a funnel fluidly connected to the condensation chamber and configured to receive liquid hydrogen from the condensation of the gaseous hydrogen; and a coupling mechanism fluidly connected to the funnel to receive the liquid hydrogen and having a nozzle downwardly movable to fluidly connect from above to an upwards facing tank inlet of a vehicle.

14. The refueling system of claim 13, comprising:

a liquefier chamber within which the condensation chamber resides, the liquefier chamber having an inlet through which the inlet tube passes and an outlet through which the nozzle passes;

a vacuum port fluidly connected to the liquefier chamber and configured to connect to a vacuum exerting mechanism to extract gases from in a vacuum space of the liquefier chamber.

15. The refueling system of claim 14, comprising:

a cryocooler mounting flange disposed at a top portion of the liquefier chamber;

radiations shields disposed between the cryocooler mounting flange and the condensation chamber to thermally insulate the cryocooler mounting flange from the condensation chamber;

wall seals disposed a) between first abutting edges of the radiation shields and a wall of the liquefier chamber and b) between second abutting edges of the radiation shield and a portion of the cryocooler located inside the liquefier chamber.

16. The refueling system of claim 13, comprising:

a bellows disposed with respect to the nozzle and fuel tank inlet with respect to which the bellows is configured to move vertically for supplying liquid hydrogen to the fuel tank inlet to provide a confined volume at which a connection is made between the nozzle and the fuel tank inlet.

17. The refueling system of claim 13, comprising:

an actuator arm configured to connect to a fuel tank cap and including a mechanism configured to, upon the nozzle being fluidly connected from above to the upwards facing tank inlet of the vehicle, actuate to remove the fuel tank cap from the fuel tank inlet, the actuator arm made of two materials to minimize heat leak towards the fuel tank, an upper portion of the actuator rod made of stainless steel and a lower portion of the actuator made of a composite material.

18. The refueling system of claim 13, comprising:

an isolation valve fluidly connected to the nozzle, the isolation valve actuated by one or more of:

pneumatically actuated using gaseous helium, electrically actuated solenoid, or manual or automated mechanically actuator.

19. The refueling system of claim 13, comprising:

a fill level sensor incorporated into the nozzle and configured to sense a fill level of the tank of the vehicle, the fill level sensor configured to one of:

inform of a fuel level of the tank of the vehicle, or cause termination of fueling upon detecting a certain fuel level in the tank.

\* \* \* \* \*